United States Patent Office 3,206,140
Patented Sept. 14, 1965

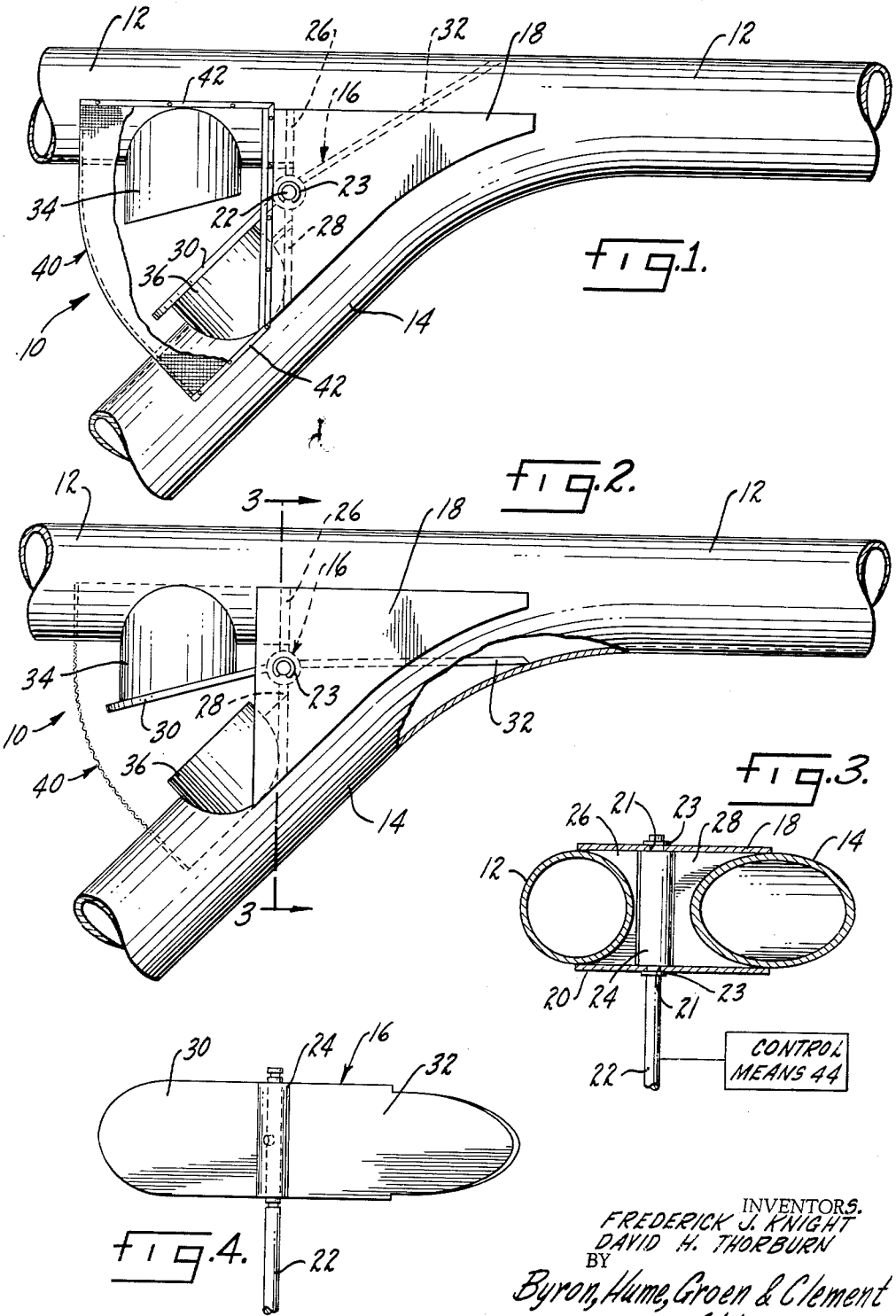

3,206,140
PNEUMATIC CARRIER SYSTEM
Frederick J. Knight, Golf, and David H. Thorburn, Oak Park, Ill., assignors to The Powers Regulator Co., Skokie, Ill., a corporation of Illinois
Filed Nov. 8, 1962, Ser. No. 236,328
6 Claims. (Cl. 243—29)

This invention relates to a pneumatic carrier system, and in particular to a switch for a pneumatic carrier system.

Pneumatic carrier systems adapted to convey message carriers to various stations in the system have been in use for a great number of years. However, large multi-station pneumatic carrier systems wherein the message carrier may be selectively sent to one of many stations have been a recent development. In such multi-station systems there is usually a main trunk conduit which divides into two or more primary branch conduits or loops, each of which branch into a plurality of secondary branch conduits, each leading to a station.

In such a multi-station system means are required to divert the message carriers from the main conduit to the appropriate primary conduit and from the particular primary branch conduit or loop to the appropriate secondary branch conduit and station.

It is therefore an object of the present invention to provide a switch for a pneumatic carrier system whereby message carriers in the system may be directed from one conduit to another.

It is a further object of the present invention to provide a switch for a pneumatic carrier system whereby message carriers in the system may be selectively directed from a conduit to any one of a plurality of other conduits in the system.

It is a further object of the present invention to provide a switch for a pneumatic carrier system whereby message carriers in the system may be directed from one conduit to another conduit, said switch being characterized by a minimal number of moving parts and being easily operated and maintained.

These and other objects are accomplished by the switch of the present invention which is adapted to divert a message carrier from a first conduit of a pneumatic carrier system to a second conduit in the pneumatic carrier system or to allow the message carrier to continue to travel in the first conduit. In accordance with the present invention, this switch is adapted to be actuated by signals given off by the message carrier or by any other suitable means. Furthermore, the switch of the present invention is adapted to assure that the pressure differential necessary in the first and second conduits to convey the message carriers therein is maintained whether or not the switch is to divert the message carrier from the first conduit to the second conduit or is to allow the message carrier to continue to move in the first conduit past the switch.

The invention, both as to its organization and method of operation, taken with further objects and advantages thereof, will best be understood by reference to the following description taken in conjunction with the accompanying drawings, in which:

FIGURE 1 is a plan view of the switch of the present invention associated with a pneumatic carrier system, said switch being shown in a position to divert a message carrier from a first conduit into a second conduit in said pneumatic carrier system;

FIGURE 2 is a plan view of the switch shown in FIGURE 1, the switch being in position to allow the message carrier to continue to travel in the first conduit of said pneumatic carrier system;

FIGURE 3 is a cross-sectional view of the switch shown in FIGURE 1, taken along line 3—3 of FIGURE 2; and FIGURE 4 is an elevational view of the deflector member of the switch illustrated in FIGURE 1.

Referring to the drawings, and more particularly to FIGURE 1, there is illustrated a portion of a multi-station pneumatic carrier system employing a switch 10 embodying the features of the present invention. In this instance, the switch 10 is associated with a main trunk conduit 12 through which a message carrier (not shown) passes, the switch 10 selectively directing the message carrier to a primary conduit 14 communicating with the main trunk conduit 12 or allowing it to continue in the main trunk conduit 12 wherein it will be directed by another switch 10 to another primary conduit communicating with the main trunk conduit 12.

It will be understood that the primary conduit 14, and the other primary conduits (not shown) connected to the main trunk conduit 12, has a plurality of stations along its length and that switches are also required in the primary conduit 14 to direct the message carrier to the particular station therein to which the message carrier is being sent. The switch 10 may be used for this purpose also.

In this instance, however, the switch 10 is utilized to direct the message carrier from the main trunk conduit 12 to the primary conduit 14 or to allow the message carrier to continue in the main trunk conduit 12 so that it may be delivered to another primary conduit, depending upon the particular station to which the message carrier is being sent. To these ends, and as shown in FIGURES 1-4, the switch 10 is positioned within the fork formed by the generally Y-shaped junction between the main trunk conduit 12 and the primary conduit 14. The switch 10 includes a pivotal deflector member indicated generally by reference numeral 16 adapted to direct the message carrier moving from right to left in the main trunk conduit 12 when viewing FIGURE 1 into the primary conduit 14 or through the junction in a manner more apparent hereinafter.

The fork of the junction between the main trunk conduit 12 and the primary conduit 14 is cut away to allow the deflector member 16 to extend therein as shown in FIGURES 1 and 2. Longitudinally extending, triangularly-shaped supporting plates 18 and 20 are welded or the like to the conduits 12 and 14 to partially enclose that portion of the fork which has been cut away and to support the pivotal deflector plate 16. The triangular plates 18 and 20 are substantially parallel to one another and each have a hole 21 therein (FIGURE 3), the holes 21 being aligned to receive a rotatable shaft 22 connected to the deflector member 16 to effect pivoting of the deflector member 16. The shaft 22 is held in position by slit-type washers 23 which cooperate with annular grooves 25 (FIGURE 4) in the shaft 22, the grooves 25 being positioned slightly beyond the supporting plates 18 and 20. It will be understood that the shaft 22 may be supported by the plates 18 and 20 in many different manners readily apparent to one with ordinary skill in the art and that this does not per se constitute a part of the present invention. Transversely extending plates 26 and 28 are positioned between the plates 18 and 20 and are welded thereto and to the conduits 12 and 14, respectively. These plates 26 and 28 extend toward one another and cooperate with an annular sleeve 24 fixedly secured to the shaft 22. In this manner the conduits 12 and 14, the supporting plates 18 and 20, the plates 26 and 28, and the annular sleeve 24 form a chamber or housing which is substantially air-tight in order that the operation of the conduits 12 and 14 is not impaired by virtue of the cut-away portion of the fork at the junction between the conduits 12 and 14.

The deflector means 16 includes an air control plate 30 and a deflector plate 32 attached to the annular sleeve 24 by welding or the like. The air control plate 30 and the deflector plate 32 extend radially outwardly from the sleeve 24 in substantially opposite directions from one another, the air control plate 30 extending outwardly from the junction of the conduits 12 and 14 while the deflector plate 32 extends into the junction between the conduits 12 and 14. The air control plate 30 is adapted to open and close ports 34 and 36 on the main trunk conduit 12 and the primary conduit 14, respectively, in order to assure that the proper operating conditions are maintained in these conduits in a manner more apparent hereinafter.

In one position, namely that illustrated in FIGURE 1, the deflector plate 32 is adapted to block the main trunk conduit 12 and thereby divert a message carrier from the main conduit 12 into the primary conduit 14. This position will hereinafter be referred to as the "closed position." In its other position, namely that illustrated in FIGURE 2, the deflector plate 32 is adapted to allow the message carrier in the main trunk conduit 12 to continue to move therein past the switch 10. This position will hereinafter be referred to as its "open position."

The ports 34 and 36 are enclosed in a filter means indicated generally by reference numeral 40, which may be wire mesh screen or the like, in order to prevent foreign matter from entering the ports 34 and 36 when they are open, which foreign matter would be detrimental in the pneumatic carrier system. The filter means 40 is secured by suitable brackets 42 (FIGURE 1) to the conduits 12 and 14 and the plates 18 and 20 to assure that no foreign solid material in the air may enter the ports 34 and 36 when they are open.

The switch 10 is operated by a control means indicated generally by reference numeral 44 which, upon actuation, rotates the shaft 22 of the switch 10 to cause the deflector member 16 to be rotated to its closed position in FIGURE 1 or its open position shown in FIGURE 2. The control means 44 may be actuated by signals from the message carrier or by any other suitable means. It will be understood that the control means 44 per se does not constitute a part of the present invention and the selection of suitable control means would be within the ordinary skill of one in the art.

In FIGURE 1 the switch 10 is illustrated in its closed position to divert the message carrier traveling toward the left in the main conduit 12 into the primary conduit 14. It will be understood that an air pump or the like is located downstream in both the conduits 12 and 14. These pumps maintain the necessary pressure differential conditions required in the conduits 12 and 14 to assure movement of the message carrier through these conduits in the proper direction. When the deflector plate 32 of the switch 10 is in its closed position, the main conduit 12 is substantially completely closed by the deflector plate 32. The port 34, which is open, assures that a pressure differential will be maintained in the main conduit 12 beyond the switch 10 and therefore that message carriers in the main conduit 12 will continue to move in the proper direction. Simultaneously the air control plate 30, when the switch 10 is closed, is positioned with respect to the deflector plate 32 so that it will completely close the port 36. In this manner, the message carrier will move from the main conduit 12 to the primary conduit 14 without slowing down or its movement being otherwise retarded. In other words, when the switch 10 is in the closed position, the port 36 must be closed by the air control plate 30 of the deflector means 16, otherwise any message carrier upstream of the switch 10 in the main conduit 12 would stop moving or its speed be at least substantially reduced.

When the switch 10 has been actuated to rotate the deflector member 16 to its open position shown in FIGURE 2, the deflector plate 32 closes the primary conduit 14 and the air control plate 30 closes the port 34. This assures that the message carriers in the main conduit 12, upstream of the switch 10, will continue to move. Furthermore, when the switch 10 is in its open position, the port 36 is also open whereby message carriers already in the primary conduit 14 will continue to move therein, as the open port 36 assures the pressure differential in the conduit 14 requisite to move the message carriers therein.

It will be noted that when the ports 34 or 36 are open air will, of course, be drawn into the conduits 12 or 14, respectively. The filter means 40, however, prevents this air from carrying solid foreign material into these conduits 12 or 14. Such foreign material could, of course, be detrimental to and impede the movement of message carries in these conduits.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A switch for a junction of a first and second conduit in a pneumatic carrier system, said switch comprising a pivotally mounted deflector means at said junction of said first and second conduits, said deflector means being adapted to divert a message carrier traveling in said first conduit into said second conduit or to allow said message carrier to continue to move in said first conduit past said switch, said first and second conduits each having ports opening to the atmosphere in close proximity to said junction, said deflector means closing the port of said second conduit when in position to divert a message carrier traveling in said first conduit into said second conduit, and said deflector means closing the port of said first conduit when in position to allow said message carrier to continue to travel in said first conduit past said switch.

2. A switch for a junction of a first and second conduit in a pneumatic carrier system, said switch comprising a deflector means pivotally mounted at said juncture of said conduits, said deflector means including a deflector plate and an air control plate, said deflector plate extending into said junction and said air control plate extending away from said junction, said first and second conduits each having ports downstream of said junction, said ports opening to the atmosphere, said deflector means being pivotal to a closed position wherein said deflector plate substantially closes said first conduit and diverts a message carrier traveling in said first conduit to said second conduit while said air control plate simultaneously closes the port of said second conduit, and said deflector means being pivotal to an open position wherein said deflector plate substantially closes said second conduit while said air control plate simultaneously closes the port of said first conduit whereby a message carrier traveling in said first conduit may continue to travel therein past said switch.

3. The switch of claim 2 wherein said deflector means includes a rotatable shaft for pivoting said deflector means, said shaft being rotated by control means actuated by said message carriers.

4. The switch of claim 3 wherein said conduits have an opening therein in order that said deflector plate may extend into said junction, housing means are provided to support said deflector means and provide a substantially air-tight chamber communicating with said conduits, said ports being positioned outside of said chamber.

5. A switch for a junction of a first and second conduit in a pneumatic carrier system, said switch comprising a deflector means having a deflector plate and an air control plate, said deflector plate extending into said junction through an opening in said conduits, said air control plate extending away from said opening, said deflector plate and air control plate being attached to a shaft, said shaft being pivotally supported by supporting means, wall means forming with said supporting means, conduits and deflector member a substantially air-tight chamber communicating with said junction through said opening, said first conduit having a first port located downstream of said switch and outside of said chamber, said second conduit having a second port downstream of said switch and outside of said chamber, said deflector means being pivotal by rotation of said shaft to a closed position wherein said deflector plate substantially closes said first conduit and diverts a message carrier traveling therein in said first conduit to said second conduit while said air control plate simultaneously closes said second port, and said deflector means being pivotable by rotation of said shaft to an open position wherein said deflector plate substantially closes said second conduit while said air control plate simultaneously closes said first port whereby a message carrier traveling in said first conduit may continue to travel therein past said switch.

6. The switch of claim 5 wherein control means actuated by said message carrier effects rotation of said shaft whereby said deflector means is pivoted to its open or closed position.

References Cited by the Examiner

UNITED STATES PATENTS

| | | | |
|---|---|---|---|
| 307,437 | 11/84 | Clay | 243—29 |
| 393,700 | 11/88 | Goebel | 243—29 |
| 1,883,844 | 10/32 | Needham | 243—31 |
| 2,710,728 | 6/55 | Halpern | 243—30 |

SAMUEL F. COLEMAN, *Primary Examiner.*